UNITED STATES PATENT OFFICE.

LOUIS ENRICHT, OF NEW YORK, N. Y., ASSIGNOR TO THE STEREO-RELIEF DECORATIVE COMPANY, OF SAME PLACE.

ART OF MAKING PLASTER CASTS.

SPECIFICATION forming part of Letters Patent No. 450,287, dated April 14, 1891.

Application filed July 31, 1890. Serial No. 360,565. (No specimens.)

*To all whom it may concern:*

Be it known that I, LOUIS ENRICHT, a citizen of the United States, residing at New York, in the county and State of New York, have invented new and useful Improvements in Composition for Treating Plaster and other Casts, of which the following is a specification.

This invention relates to the art of making plaster casts, statuettes, and other articles; and it consists among other things in a new composition to be used in making the same, as set forth in the following specification and claims.

In carrying out my invention I prepare a solution composed of the following ingredients in about the proportions mentioned, namely: lime-water, about ten gallons; dextrine, about five pounds; sesquioxide of iron, about six pounds, and stir the mixture thoroughly together. Taking a portion of this solution, which I name "preparatory solution," I add thereto a quantity of plaster-of-paris, and make therewith a plastic mass of the proper consistency for molding or forming the casts, statuettes, or other articles to be made, using as much of the solution and of the plaster-of-paris as are required for the work in hand. When the composition thus made by the union of the solution and the plaster-of-paris has set, it becomes very hard, and its surface is susceptible of becoming highly polished. For polishing its surface agate, horn, ivory, or other burnishing or polishing tools can be employed.

What I claim as new, and desire to secure by Letters Patent, is—

1. The preparatory solution above mentioned for use in making statuettes, ornaments, and other articles, which consists of lime-water, dextrine, and sesquioxide of iron mixed together, substantially as above described.

2. The composition for making casts, statuettes, and other articles, which consists of plaster-of-paris combined with the solution above named, consisting of lime-water, dextrine, and sesquioxide of iron, mixed together, substantially as above described.

In testimony whereof I have hereunto set my hand in the presence of two subscribing witnesses.

LOUIS ENRICHT.

Witnesses:
WM. C. HAUFF,
E. F. KASTENHUBER.